United States Patent

[11] 3,543,788

[72] Inventor John W. Mullins
P.O. Box 20524, Oklahoma City,
Oklahoma 73120
[21] Appl. No. 755,000
[22] Filed Aug. 23, 1968
[45] Patented Dec. 1, 1970

[54] SERVICE VALVE
4 Claims, 3 Drawing Figs.
[52] U.S. Cl. .................................................. 137/318;
285/197
[51] Int. Cl. ..................................................... F16k 43/00;
F16l 41/04
[50] Field of Search .......................................... 137/223,
231, 232, 234.5, 317, 318, 316; 77/37—42;
285/197, 198, 199

[56] References Cited
UNITED STATES PATENTS
| | | | |
|---|---|---|---|
| 3,115,889 | 12/1963 | Franck et al. ................. | 137/318 |
| 3,162,211 | 12/1964 | Barusch ....................... | 137/318 |
| 3,428,075 | 2/1969 | Wagner ........................ | 137/318 |
| 3,450,149 | 6/1969 | Brinda .......................... | 137/318 |

Primary Examiner—William F. O'Dea
Assistant Examiner—David R. Matthews
Attorney—Robert K. Rhea ABSTRACT: Oppositely disposed parallel plates journal the respective end portions of a pair of spaced-apart parallel standards to form a pipe clamping means. Each of the standards are provided with cooperating recesses, intermediate their ends, for nesting a peripheral portion of a line to be tapped when surrounded by the clamp means. One of the plates threadedly receives a valve housing having a line piercing core.

Patented Dec. 1, 1970 3,543,788

JOHN W. MULLINS
*INVENTOR.*

BY
*Robert K. Rhea*
AGENT 3,543,788

SERVICE VALVE

CROSS REFERENCE TO RELATED APPLICATION

The present invention is an improvement over my copending application for Line Clamping Self-Tapping Service Valve now U.S. Pat. No. 3,509,905, Ser. No. 683,382, filed Nov. 15, 1967

BACKGROUND OF THE INVENTION

The present invention relates to a line clamping and self-tapping service valve for a plurality of sizes of refrigerant lines.

Many sealed refrigerating systems are not provided with service valves on the high- or low-pressure refrigerant conductor line. It is highly desirable to provide a means for ascertaining the amount of refrigerant gas or lack of it contained by the system or to determine on which side of the compressor the trouble lies without disassembling the system.

Most service valves of this class require that the refrigerant gas be removed from a conductor line and the service valve soldered into the empty line thus necessitating a recharging of the system. Removal of the gas is also necessary because of the necessary heat used in soldering the valve housing on the line. The principal distinction between this application and the above copending application resides in the manner of attaching the valve housing to a line to be tapped.

This invention includes a clamping means for connecting a valve housing to a refrigerant line, or the like, wherein the clamping means is manually assembled transversely around the line. Standards, forming a part of the clamping means, are provided with a plurality of cooperating recesses in their respective sides for nesting a peripheral portion of a range of sizes of lines. Thus, this clamping means and a valve housing may be easily installed on and tap a line without the use of special tools, brazing or soldering the line. Furthermore, this service valve and line clamping means eliminates the necessity of removing refrigerant gas from the line during its connection therewith.

SUMMARY OF THE INVENTION

A clamping means surrounds a peripheral portion of a line to be tapped. The clamping means comprises a pair of parallel plates having recesses in their respective and portions which journal the respective end portions of a pair of parallel spaced-apart standards, each having cooperating recesses in their respective sides which nest a peripheral portion of a line to be tapped when the clamp means is placed therearound. pins, slidably received by apertures in one of the plates and one end of the standards, support the clamp means on the line. One of the plates is threadedly apertured for receiving a threaded end portion of a valve housing with its axis normal to the axis of the line being tapped. The valve housing is provided with a line piercing mandrel which ruptures and seals with the line for communication between the bore thereof and a gas passageway formed by the valve housing. Thus, this clamp means and valve housing may be assembled on and tap a refrigerant line by the use of only a small wrench and without evacuating the line. Furthermore, the different recesses formed in the sides of the standards permit this service valve to be connected with and tap a range of sizes of refrigerant lines.

The principal object of this invention is to provide a single service valve and line clamping means for transversely surrounding and tapping a plurality of sizes of refrigerant lines which forms a seal with the wall of the tapped line.

DESCRIPTION OF THE PREFERRED EMBODIMENT

Figure 1:
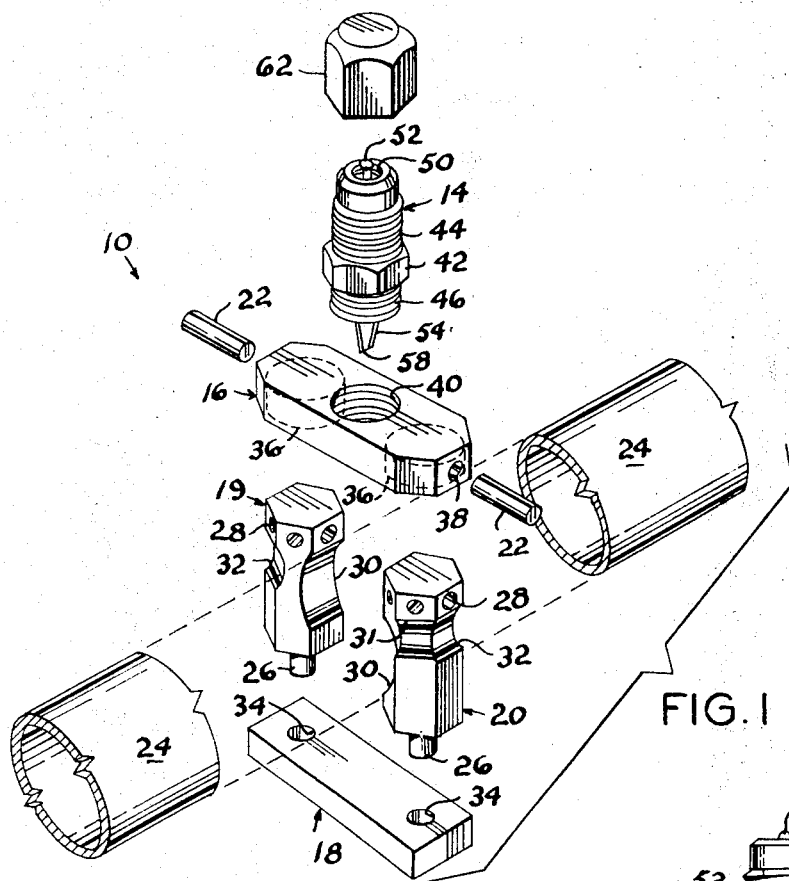
FIG. 1 is an exploded perspective view of the device and a fragment of a line to be tapped with the central portion of the line broken away for clarity.

Like characters of reference designate like parts in those figures of the drawings in which they occur.

In the drawings:

The reference numeral 10 indicates the device, as a whole, comprising a pipe clamping means 12 and a valve housing 14. The pipe clamping means comprises an upper or top plate 16, a lower or bottom plate 18, standards 19 and 20 and a pair of pins 22.

The standards 19 and 20 are mirror images of each other and in the interest of brevity only the standard 20 will be described in detail which comprises a relatively short length of hexagonal bar stock having a length extending beyond the outside diameter of a pipe or line, indicated at 24, to be tapped. One end portion of the standard 20 is diametrically reduced to form a coaxial stem 26 while each face or surface of its hexagonal shape at its other end portion is transversely drilled, as at 28, for reception of one of the pins 22 as hereinafter described. Each face of the hexagonal shape is recessed on different radii, respectively, as at 30, 31 and 32, complemental with respect to the outside radius of a pipe or line to be tapped.

The bottom plate 18 is rectangular in general configuration having a width substantially equal to the diameter of the standards and a length slightly greater than the distance between the outwardly disposed surfaces of the standard 19 and 20 when positioned on opposing sides of the line 24. The plate 18 is provided with a socket or aperture 34 adjacent each of its ends for cooperative reception of the stem 26 when the standards are disposed on opposing sides of the line 24.

The top plate 16 is similarly rectangular in general configuration having a width and length substantially equal with respect to the bottom plate 18. The depending surface, as seen in the figures, of each end portion of the top plate is provided with a recess or socket 36 which cooperatively nest the respective upper end portion of the standards 19 and 20 when the latter are straddling the line 24. Th top plate 16 is longitudinally drilled from each end, as at 38, for communication with each of the sockets 36 and receiving pins 22 which extend through the respective alined bore 28 thus locking the top plate to the standards. The top plate 16 is centrally drilled and threaded, as at 40, on an axis normal to the line 24 and parallel with respect to the longitudinal axis of the standards when positioned on opposing sides of the line 24.

The valve housing 14 is generally cylindrical having a diametrically larger hexagonal head portion 42, intermediate its ends, and opposing threaded end portions 44 and 46. The housing is centrally bored, as at 48, and internally threaded, as at 50, for receiving a conventional air valve core 52 and having a seat 53 which seals with a seat formed on the core 52. The other end portion of the housing 14 is provided with an integral diametrically reduced coaxial outer tapered wall pin or mandrel 54, having a central bore 56 communicating with the bore 48, projecting beyond the threads 46 and terminating in a beveled end surface 58. This end portion of the housing is further characterized by a cylindrical recess 60 surrounding the juncture of the mandrel 54 with the body for receiving a gasket, or the like, if desired. A dust cap 62, engageable with the threads 44, is placed thereon when the device is not in use.

OPERATION

In operation the clamp means 12 is installed on a line to be tapped, such as the line 24, by manually positioning the standards 19 and 20 on opposing sides of the line with the standard recesses 30 nesting a peripheral portion of the line. The bottom plate 18 is manually positioned over the stems 26 while the top plate 16 is placed over the other ends of the standards. The relationship between the line nesting radii and the spacing of the bottom plate apertures and the spacing of the top plate sockets 36 is such that the standards and plates are frictionally engaged with each other and the line 24 at the respective points of contact as an aid in maintaining the clamp means on the line prior to insertion of the pins and valve housing as opposed to a loose fit of the line clamp means. The pins 22 are then inserted into the respective apertures 38 and 28. The housing 14 is then screwed into the top plate opening 40 until the mandrel 54 pierces the line 24. The device is then in operative position for adding or removing refrigerant gas through the air valve core closed passageway of the valve housing. Movement of the housing into and during rupture of the line is achieved by the clamping effect of the standards pin locked to the top plate 16 wherein the bottom plate prevents any outward movement of the standards as a result of the force applied thereto by threadedly engaging the housing with the top plate threads 40.

Figure 3:
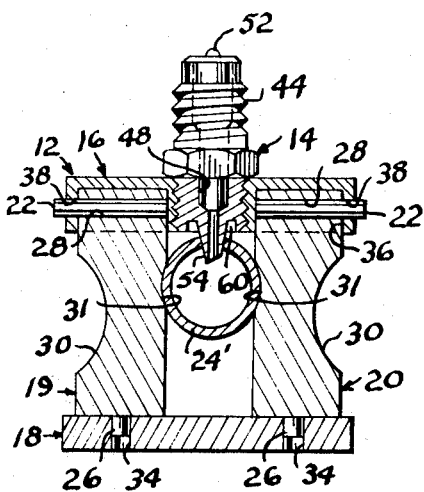
Figure 2:
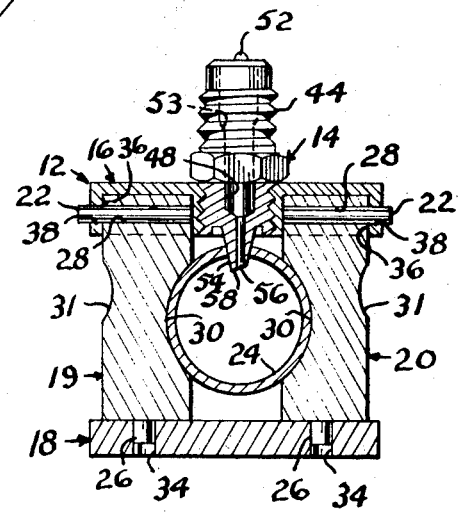
FIG. 2 is a vertical cross-sectional view, partially in elevation, of the device, when assembled on a line; and, FIG. 3 is a view similar to FIG. 2 illustrating the device connected with a smaller size line.

When it is desired to use the device on a line of smaller diameter than the line 24, the standards 19 and 20 are manually rotated about the longitudinal axis from the position shown in FIGS. 1 and 2, so that one of the recesses formed on the smaller radii cooperatively nests a peripheral portion of the selected line, indicated at 24'(FIG. 3).

I claim:

1. A line tapping service valve, comprising: a clamp means including pairs of parallel members transversely surrounding a line to be tapped each pair of the parallel members being separable members, one pair of said pairs of members comprising a pair of standards having recesses cooperatively formed in their respective side surfaces for nesting a peripheral portion of a line to be tapped, the other pair of said pairs of members comprising a pair of plates, said plates each having sockets formed in its respective end portion facing toward the opposite one of said plates for nesting a respective end portion of said pair of standards; a centrally bored valve housing engaged with one of said members, the bore of said housing forming a gas passageway with its axis normal of a line to be tapped; line piercing means formed on the line engaging end of said housing; and a valve within said housing for opening and closing the gas passageway.

2. Structure as specified in claim 1 in which an end portion of each said standards is transversely apertured, and in which one of said plates is provided with an aperture in its respective end portions alined with the respective aperture in said standards; and a pin slidably received by the alined apertures for locking said clamp means on a line to be tapped.

3. Structure as specified in claim 2 in which one plate of said pair of plates is centrally bored and threaded on an axis normal to the axis of a line to be tapped for threadedly receiving said housing.

4. Structure as specified in claim 3 which the line piercing means comprises a substantially truncated conical-shaped mandrel extending beyond the clamp means toward a line to be tapped and forming a beveled line piercing tip when said housing is rotated about its longitudinal axis.